United States Patent
Syrjärinne et al.

(10) Patent No.: US 10,809,349 B2
(45) Date of Patent: Oct. 20, 2020

(54) SUPPORTING POSITIONING QUALITY ASSURANCE

(71) Applicant: HERE GLOBAL B.V., Eindhoven (NL)

(72) Inventors: Jari Syrjärinne, Tampere (FI); Pavel Ivanov, Tampere (FI); Lauri Wirola, Tampere (FI); Irshan Muhammad Khan, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 65 days.

(21) Appl. No.: 15/532,706

(22) PCT Filed: Dec. 4, 2014

(86) PCT No.: PCT/EP2014/076520
§ 371 (c)(1),
(2) Date: Jun. 2, 2017

(87) PCT Pub. No.: WO2016/086994
PCT Pub. Date: Jun. 9, 2016

(65) Prior Publication Data
US 2017/0371023 A1    Dec. 28, 2017

(51) Int. Cl.
*G01S 5/02* (2010.01)
*H04W 4/02* (2018.01)

(52) U.S. Cl.
CPC .......... *G01S 5/0252* (2013.01); *H04W 4/025* (2013.01)

(58) Field of Classification Search
None
See application file for complete search history.

(56) References Cited

U.S. PATENT DOCUMENTS

| | | |
|---|---|---|
| 7,609,650 B2 | 10/2009 | Roskowski et al. |
| 8,385,943 B1 | 2/2013 | Han et al. |
| 8,504,288 B2 | 8/2013 | Kadous et al. |

(Continued)

FOREIGN PATENT DOCUMENTS

| | | |
|---|---|---|
| CN | 103120000 A | 5/2013 |
| EP | 1 227 694 A1 | 7/2002 |

(Continued)

OTHER PUBLICATIONS

Office Action for U.S. Appl. No. 15/531,287 dated Jan. 25, 2018, 32 pages.

(Continued)

*Primary Examiner* — Whitney Moore
(74) *Attorney, Agent, or Firm* — Alston & Bird LLP

(57) ABSTRACT

An apparatus obtains fingerprints that have been collected by at least one mobile device for supporting a positioning of other mobile devices. Each fingerprint comprises results of measurements on radio signals of at least one communication node at a particular location and an indication of the particular location. The apparatus determines a positioning quality that can be achieved in a positioning which is based on obtained fingerprints collected by the at least one mobile device. The apparatus generates, based on the determined positioning quality, a feedback to a user of the at least one mobile device, the feedback indicating whether further fingerprints should be collected.

20 Claims, 7 Drawing Sheets

201 — Obtain fingerprints that have been collected by at least one mobile device for supporting a positioning of other mobile devices, each fingerprint comprising results of measurements on radio signals of at least one communication node at a particular location and an indication of the particular location.

202 — Determine a positioning quality that can be achieved in a positioning which is based on obtained fingerprints collected by the at least one mobile device.

203 — Generate, based on the determined positioning quality, a feedback to a user of the at least one mobile device, the feedback indicating whether further fingerprints should be collected.

(56) References Cited

U.S. PATENT DOCUMENTS

| | | | |
|---|---|---|---|
| 8,548,497 | B2 | 10/2013 | Lymberopoulos et al. |
| 8,594,680 | B2 | 11/2013 | Ledlie et al. |
| 8,688,396 | B2 | 4/2014 | Lin et al. |
| 10,139,471 | B2 | 11/2018 | Ivanov et al. |
| 10,175,336 | B2 | 1/2019 | Ivanov et al. |
| 2006/0089153 | A1 | 4/2006 | Sheynblat |
| 2008/0113672 | A1* | 5/2008 | Karr .................. G01S 1/026 455/456.1 |
| 2011/0039580 | A1 | 2/2011 | Wigren et al. |
| 2011/0176523 | A1 | 7/2011 | Huang et al. |
| 2011/0306365 | A1 | 12/2011 | Wirola et al. |
| 2012/0139790 | A1 | 6/2012 | Wirola et al. |
| 2012/0184219 | A1 | 7/2012 | Richardson et al. |
| 2012/0225663 | A1 | 9/2012 | Gupta et al. |
| 2013/0035109 | A1 | 2/2013 | Tsruya et al. |
| 2013/0072216 | A1 | 3/2013 | Ledlie |
| 2013/0162481 | A1 | 6/2013 | Parvizi et al. |
| 2013/0210449 | A1 | 8/2013 | Flanagan |
| 2013/0260771 | A1 | 10/2013 | Wirola et al. |
| 2013/0281111 | A1* | 10/2013 | Syrjarinne .......... G01S 5/0252 455/456.1 |
| 2013/0288704 | A1 | 10/2013 | Wirola et al. |
| 2014/0106773 | A1 | 4/2014 | Li |
| 2014/0141803 | A1* | 5/2014 | Marti ................. H04W 4/043 455/456.2 |
| 2014/0171098 | A1 | 6/2014 | Marti et al. |
| 2014/0171118 | A1 | 6/2014 | Marti et al. |
| 2014/0194139 | A1 | 7/2014 | Yang et al. |
| 2014/0213298 | A1 | 7/2014 | Marti et al. |
| 2015/0181372 | A1* | 6/2015 | Huang ............... H04W 4/029 455/456.1 |
| 2015/0341895 | A1* | 11/2015 | Zhang ............... G01S 5/021 455/456.1 |
| 2015/0346313 | A1 | 12/2015 | Smith et al. |
| 2016/0018507 | A1* | 1/2016 | Chen .................. H04W 4/043 455/456.2 |
| 2016/0161592 | A1 | 6/2016 | Wirola et al. |
| 2017/0055130 | A1 | 2/2017 | LeBlanc et al. |
| 2017/0188199 | A1 | 6/2017 | Ashley et al. |
| 2017/0276760 | A1 | 9/2017 | Ashely et al. |
| 2018/0069932 | A1* | 3/2018 | Tiwari ............... G01S 5/0252 |

FOREIGN PATENT DOCUMENTS

| | | | |
|---|---|---|---|
| WO | WO 2011/070551 | A1 | 6/2011 |
| WO | WO 2012/032376 | A1 | 3/2012 |
| WO | WO 2012/139250 | A1 | 10/2012 |
| WO | WO 2013/065042 | A1 | 5/2013 |
| WO | WO 2013/070170 | A1 | 5/2013 |
| WO | WO 2013/128059 | A1 | 9/2013 |
| WO | WO 2014/026338 | A1 | 2/2014 |
| WO | WO 2014/065735 | A1 | 5/2014 |
| WO | WO 2015/198091 | A1 | 12/2015 |

OTHER PUBLICATIONS

Office Action for U.S. Appl. No. 15/532,717 dated Jan. 26, 2018, 16 pages.
International Search Report and Written Opinion for Application No. PCT/EP2014/076519, dated Sep. 3, 2015, 10 pages.
International Preliminary Report on Patentability for Application No. PCT/EP2014/076520, dated Jun. 15, 2017, 9 pages.
International Search Report and Written Opinion for Application No. PCT/EP2014/076520, dated Jul. 27, 2015, 11 pages.
International Search Report and Written Opinion for Application No. PCT/EP2014/078952 dated Jul. 23, 2015, 10 pages.
Cisco Mobile Services Engine—Context Aware Mobility Solution Deployment Guide [online] [retrieved Dec. 19, 2014]. Retrieved via the Internet: <http://www.cisco.com/c/en/us/support/docs/wireless/mobility-services . . . > (dated Jul. 16, 2009) 52 pages.
Farid, Z. et al., Recent Advances in Wireless Indoor Localization Techniques and Systems, Journal of Computer Networks and Communications, vol. 2013, Art ID 185138 (dated 2013), 12 pages.
Nurminen, H. et al., Statistical Path Loss Parameter Estimation and Positioning Using RSS Measurements in Indoor Wireless Networks, 2012 IEEE, International Conference on Indoor Positioning and Indoor Navigation (Nov. 2012) 9 pages.
Tsui, A. W. et al., Accuracy Performance Analysis Between War Driving and War Walking in Metropolitan WiFi Localization, IEEE Transactions on Mobile Compting, vol. 9, Issue 11 (Jul. 1, 2010) 13 pages.
Wu, C. et al., DorFin: WiFi Fingerprint-Based Localization Revisited, [online] Retrieved from the Internet: http://arxiv.org/pdf/1308.6663.pdf. (dated Aug. 30, 2013) 10 pages.
Notice of Allowance for U.S. Appl. No. 15/531,287 dated Aug. 30, 2018.
Notice of Allowance received for U.S. Appl. No. 15/532,717 dated Jul. 16, 2018.
Office Action for European Application No. 14818997.0 dated Aug. 14, 2019.
Office Action for European Application No. 14811805.2 dated Oct. 7, 2019.
Eisa, S. et al., Removing Useless APs and Fingerprints From WiFi Indoor Positioning Radio Maps, 2013 International Conference on Indoor Positioning and Indoor Navigation (Oct. 2013).
Gallagher, T., , Database Updating Through User Feedback in Fingerprint-Based WiFi Location Systems, 2010 Ubiquitous Positioning Indoor Navigation and Location Based services, Kikkonummi (2010) 8 pages.
Gunuwan, M., A New Method to Generate and Maintain a WiFi Fingerprinting Database Automatically by Using RFID, 2012 International Conference on Indoor Positioning and Indoor Navigation (IPIN) (2012) 6 pages.
Kim, Y. et al., Scalable and Consistent Radio Map Management Scheme for Participatory Sensing-Based Wi-Fi Fingerprinting, Pervasive and Mobile Computing, vol. 40, Issue C (2017) 379-413.
Nurminen, H., Position Estimation Using RSS Measurements With Unknown Measurement Model Parameters, Master of Science Thesis, Tampere University of Technology (Dec. 2012) 64 pages.
Stook, J. et al., Localization With Wi-Fi Fingerprinting: Towards Indoor Navigation on Smartphones, www.gdmc.nl/publications/2012/Localization_with_Wifi_Fingerprinting.pdf (dated 2012) 5 pages.
Office Action for Chinse Application No. 201480084613.6 dated Sep. 4, 2019, 15 pages.
Office Action for European Application No. 14 811 806.0 dated Jan. 17, 2020, 5 pages.
Machaj, J. et al., Rank Based Fingerprinting Algorithm for Indoor Positioning, IEEE (2011) 6 pages.
Wi-Fi positioning system—Wikipedia [online] [retrieved Jan. 10, 2020]. Retrieved via the Internet: https://en.wikipedia.org/w/index.php?title=Wi-FI_positioning_system&oldid=632847291 (dated Nov. 7, 2014) 2 pages.
Office Action for Chinese Application No. 201480084613.6 dated May 14, 2020, 14 pages.
Office Communication for European Application No. 14 811 805.2 dated Apr. 29, 2020, 3 pages.

* cited by examiner positioning quality good
positioning quality satisfactory
positioning quality poor
positioning quality unknown no further collection required
further collection required

SUPPORTING POSITIONING QUALITY ASSURANCE

FIELD OF THE DISCLOSURE

The invention relates to the field of positioning and more specifically to supporting positioning quality assurance.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information.

A similar approach could be used for a positioning that is based on other types of terrestrial communication nodes or on a combination of different types of terrestrial communication nodes.

SUMMARY OF SOME EMBODIMENTS OF THE INVENTION

An example embodiment of a method according to the invention comprises, performed by at least one apparatus, obtaining fingerprints that have been collected by at least one mobile device for supporting a positioning of other mobile devices, each fingerprint comprising results of measurements on radio signals of at least one communication node at a particular location and an indication of the particular location. The method further comprises determining a positioning quality that can be achieved in a positioning which is based on obtained fingerprints collected by the at least one mobile device. The method further comprises generating, based on the determined positioning quality, a feedback to a user of the at least one mobile device, the feedback indicating whether further fingerprints should be collected.

An example embodiment of a first apparatus according to the invention comprises means for performing the actions of any embodiment of the presented example method.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the presented example method.

Any of the described apparatuses may comprise only the indicated components or one or more additional components.

Moreover an example embodiment of a system is presented, which comprises any embodiment of any presented example apparatus. The apparatus is one of the mobile device and a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting positioning quality assurance. In certain embodiment, any of the presented first apparatuses is an apparatus for supporting positioning quality assurance.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
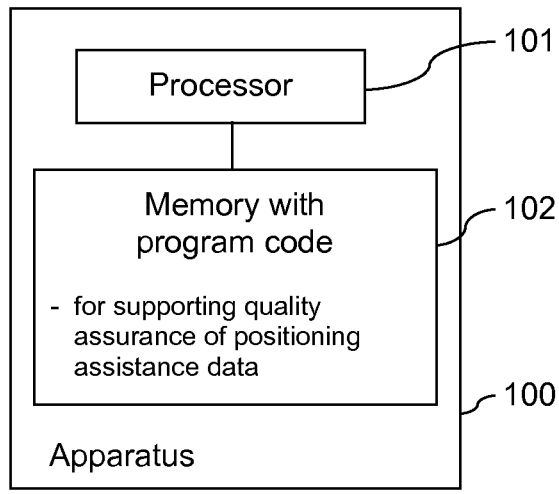
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for supporting positioning quality assurance. Processor 101 is configured to execute computer program code stored in memory 102 in order to cause an apparatus to perform desired actions.

Apparatus 100 could be a stationary device, like a dedicated quality assurance server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus obtains fingerprints that have been collected by at least one mobile device for supporting a positioning of other mobile devices. Each fingerprint comprises results of measurements on radio signals of at least one communication node at a particular location and an indication of the particular location. (action 201)

The apparatus furthermore determines a positioning quality that can be achieved in a positioning which is based on obtained fingerprints collected by the at least one mobile device. (action 202)

The apparatus furthermore generates, based on the determined positioning quality, a feedback to a user of the at least one mobile device, the feedback indicating whether further fingerprints should be collected. (action 203)

The quality of an indoor positioning which is based on collected fingerprints may depend on the coverage and density of the collected fingerprints. Collecting fingerprints via crowd-sourcing may result in a large number of fingerprints; however, this may mean for some areas that more fingerprints have to be processed than needed, while other areas that are rarely visited may not be represented at all.

Therefore, collecting agents may be recruited to survey particular localization sites in a systematic manner, in order to increase the coverage at these sites. Such localization sites may comprise for instance a building or some other venue that is important for a company or an association of companies. Still, even if a collecting agent moves through a site in a systematic manner, it is not possible to tell whether sufficient fingerprints are being collected at all locations of the site. For instance, more fingerprints may be needed from areas with walls than from open areas, etc.

Certain embodiments of the invention therefore allow determining the quality of positioning that can be achieved with fingerprints that have been collected so far by a mobile device and providing an indication to a user of the device whether collection of further fingerprints would be appropriate.

Certain embodiments of the invention may have the effect that a user of mobile device who surveys a site for collecting fingerprints in a systematic manner receives a feedback on his work. This may ensure on the one hand that the user does not spend more time than needed for collecting fingerprints at a particular site, if the fingerprints that have been collected so far already enable a positioning at the site with satisfactory quality. This may be of value, since data collection is a laborious process and after a certain point, an increasing density and number of collected fingerprints is not suited to further improve the positioning accuracy. Thus, costs for the collection of more data than needed as well as processing resources for processing more data than needed may be reduced. On the other hand, the feedback may ensure that the user does not stop the collection of fingerprints at a particular site, if the fingerprints that have been collected so far do not yet enable a positioning at the site with satisfactory quality. This may be of value, since the need for a supplementary survey of the site may be avoided. This may save costs for the new survey and also avoid negative user experience of other users, who are trying to determine their position based on the collected data, in the meantime.

Figure 2:
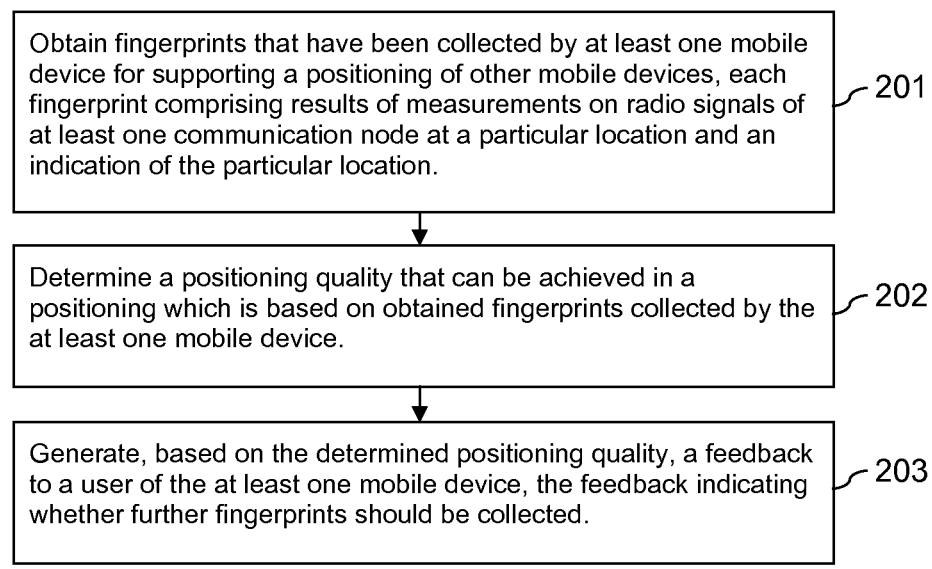
FIG. 2 is a flow chart illustrating an example embodiment of a method.

Apparatus 100 illustrated in FIG. 1 and the method illustrated in FIG. 2 may be implemented and refined in various ways.

In an example embodiment, determining a positioning quality comprises selecting some of the obtained fingerprints as test fingerprints; generating, based on the obtained fingerprints excluding the test fingerprints, a radio model supporting a positioning of mobile devices that are configured to perform measurements on radio signals of communication nodes; estimating for results of measurements in each of the test fingerprints a location of measurements based on the generated radio model; and comparing for each test fingerprint the estimated location with the particular location indicated in the test fingerprint, wherein a result of the comparison forms a basis of the positioning quality.

This may have the effect that the quality of an obtained set of fingerprints may be checked based on the obtained fingerprints as such. As a result, a feedback on a collected set of fingerprints may be available while a user is still at the collection site and may thus complete the collection of fingerprints, if necessary, right away.

In an example embodiment, selecting some of the obtained fingerprints as test fingerprints comprises selecting every nth of the obtained fingerprints, with n being a natural number greater than 1. This may have the effect that the test fingerprints are selected in a uniform manner. Alternatively, the test fingerprints could be selected for example in a pseudo random manner or using any other desired approach.

The location in a fingerprint may have only a horizontal component, for instance a longitude value and a latitude value. Alternatively, it could also have an altitude component. Considering an altitude value may be of particular interest for indoor positioning. In outdoor positioning it is often enough to achieve horizontal position estimates using a two-dimensional map, whereas indoors, especially in tall buildings, it may be of interest to have a capability to estimate the floor on which a person is located as well. Including an altitude component in the fingerprints may allow determining the floor of a building in which a mobile device and thus a person using the device is located. The altitude value can indicate for example an absolute altitude, a relative altitude compared to the altitude of the ground floor of a building or a floor number. The altitude component for a fingerprint may be determined in a different manner than the horizontal location, for instance using a calibrated barometer, an uncalibrated barometer or an input of a user indicating the floor on which fingerprints are to be collected.

In an example embodiment, comparing for a respective test fingerprint the estimated location with the indication of the particular location in the test fingerprint comprises determining at least one discrepancy between the estimated location and the particular location. In an example embodiment, comparing for a respective test fingerprint the estimated location with the indication of the particular location in the test fingerprint comprises at least determining a distance between a horizontal component of the estimated location and a horizontal component of the particular location. The distance may be computed, for example, as an Euclidean distance. Alternatively or in addition, comparing for a respective test fingerprint the estimated location with the indication of the particular location in the test fingerprint may comprise determining a difference in altitude between an altitude component of the estimated location and an altitude component of the particular location. Instead of determining a difference in altitude, it could be possible to determine a difference in the floor number corresponding to an altitude component of the estimated location and a floor number corresponding to an altitude component of the particular location in the fingerprint. If the altitude component of the particular location in the fingerprint does not comprise a floor number but only an indication of an absolute or relative altitude, the altitude value may be mapped to a floor number for instance based on information about a particular building in which the fingerprints are being taken, or based on average values of the height of floors.

The positioning quality could be determined for a localization area as a whole for which a set of fingerprints is being collected. This approach may be suited to indicate to the user of the mobile device whether he may turn to another localization area or whether further fingerprints have to be collected for the current localization area.

In an alternative example embodiment, however, the positioning quality is determined for each of a plurality of subareas for which fingerprints are to be collected. The subareas may be predetermined. They could correspond for instance to grid areas of a virtual regular grid covering the localization site. The positioning quality for a subarea may be based on a result of a comparison of estimated locations for test fingerprints with locations indicated in test fingerprints for all test fingerprints which comprise an indication of a location lying in the subarea. This may have the effect that a user of the mobile device can be informed quite accurately, from which subareas further fingerprints might still be needed. Alternatively, the positioning quality for a subarea may be based on a result of a comparison of estimated locations for test fingerprints with locations indicated in test fingerprints for all test fingerprints which comprise an indication of a location lying in the subarea, and in addition on a density of obtained fingerprints which comprise an indication of a location lying in the subarea. This may have the additional effect that subareas with poor positioning quality in spite of a large number of available fingerprints for this subarea may be omitted from further collection of fingerprints, since in this case improving the positioning quality may not be possible by collecting more fingerprints in this subarea. It is to be understood that various other criteria could be considered as well.

If several test fingerprints are considered for a respective subarea, a positioning quality for the subarea could be based for example on an average distance between a true location and an estimated location for all relevant test fingerprints and/or percentage of all relevant test fingerprints, for which a correct floor has been estimated. The area and/or the percentage could then be compared to one or more predetermined thresholds for deciding on an assumed positioning quality.

It is to be understood, however, that there are also alternative options for assigning different positioning qualities to different parts of a localization site. For instance, a positioning quality could be determined individually for each test fingerprint. Then, the surrounding area of the location indicated in the test fingerprint could be classified according to the determined positioning quality. The surrounding area could be for instance a circular area having a predetermined radius or a square area having a predetermined size. In the case of overlapping parts of surrounding areas, the lower quality could be assumed to be valid for the overlapping part, by way of precaution. Areas surrounding the location indicated in a test fingerprint and having a uniform assigned positioning quality may be considered to be subareas of the localization site.

In an example embodiment, the determined positioning quality for a respective subarea is classified to be poor or good. Such a classification or a similar classification may have the effect that on its basis, a feedback can be provided to a user that is very easy to understand, in particular while walking around. In another example embodiment, the determined positioning quality for a respective subarea is classified to be poor or satisfactory or good. In another example embodiment, the determined positioning quality for a respective subarea is classified to be poor or satisfactory or good or unknown. Such classifications or similar classifications may have the effect that on their basis differentiated information can be provided to a user.

In an example embodiment, the determined positioning quality for a respective subarea is classified to be such that it requires additional measurements or that it does not require additional measurements. Such a classification may have the effect that other criteria than the quality of determined positions of test fingerprints may be taken into account in addition, like the density of fingerprints in a particular subarea.

In an example embodiment, a matrix for each floor of a localization area for which fingerprints have been collected may be generated. Each cell of the matrix corresponds to a subarea and each cell of the matrix includes a positioning quality indicator for the associated subarea. The positioning quality indicator is based on the determined positioning quality for the subarea. This may have the effect that the information can be efficiently transferred from a component determining the positioning quality to a component taking care of providing a feedback to a user. The positioning quality indicator could be of an enumeration type.

In an example embodiment, generating a feedback to the user comprises presenting, on a display, a map of an area in which fingerprints are to be collected, the map including a marking for each of a plurality of subareas, the marking depending on a positioning quality determined for the respective subarea. This may have the effect that the user can be informed in a clear and yet comprehensive manner about the positioning quality that can be achieved in a particular localization area with the fingerprints that have been collected so far and/or about subareas in which further fingerprints should be collected.

The positioning quality may be determined for example upon a request of the user, for example at a point of time when the user has completed a first survey of a site or a first survey of a floor of a site or a first survey of a section of a site. The determination may be performed only once in this case, or the user may request a new determination after some further fingerprints have been collected and added to the set of fingerprints, until the user is satisfied with the result.

In an alternative example embodiment, determining the positioning quality is performed on a regular basis during a collection of fingerprints by the at least one mobile device at a particular site. The regular basis may be defined in terms of time or in terms of the number of fingerprints that have been collected after the preceding determination of the positioning quality. This may have the effect of reducing the number of tasks that have to be performed by the user. In some embodiments, the regular basis may be defined such that a continuous or basically continuous determination of the positioning quality is performed for a constantly growing set of fingerprints. The positioning quality could be determined in this case for example after each newly collected fingerprint or after, for example, every thirtieth newly collected fingerprint. Alternatively, the positioning quality could be determined in this case for example every second or every thirty seconds. It is to be understood that any other number of fingerprints or any other time interval in particular in between the indicated examples but also exceeding the indicated examples could be used just the same. For a basically continuous determination of the positioning quality, the number of fingerprints or the time interval could be selected for example such that it is expected to be sufficient for capturing enough fingerprints in a respective subarea. Using a basically continuous determination of the positioning quality may have the effect that the user can be informed continuously about the progress in collecting fingerprints so that he may optimize his surveying route in the localization area. Furthermore, it may have the effect that the user is enabled to adapt his future survey movements, in order to reduce the need for the collection of additional fingerprints in subareas that have already been covered.

In an example embodiment, the at least one communication node comprises at least one terrestrial communication node, since satellite signals may be less suited for indoor positioning. In an example embodiment, the at least one communication node comprises at least one non-cellular terrestrial communication node. The at least one non-cellular terrestrial communication node could comprise any non-cellular ground based communication node that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth communication nodes are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one communication node could also comprise at least one cellular transmitter, like a base station of a cellular communication network. However, due to the narrow frequency bands of cellular signals, WLAN and Bluetooth nodes may generally enable a more accurate positioning. Furthermore, communication nodes transmitting any other kind of wireless signals, including for instance ultra-wideband (UWB) signals or any wireless signals that might emerge in the future, may be used as well. The communication nodes do not even have to be ground-based necessarily. For example, the communication nodes could also comprise communication nodes in a ship.

In an example embodiment, the apparatus determining the positioning quality is or belongs to the mobile device which collects the fingerprints. This may have the effect that the mobile device may operate independently of a server with respect to the collection of fingerprints. This means that the mobile device does not necessarily have to have communication capabilities for communicating with a server via the air interface, or that it does not have to rely on a connectivity to a server for example via a cellular communication network—at any location at which information on the positioning quality may be desired. In an alternative example embodiment, the apparatus determining the positioning quality is or belongs to a server that is configured to receive and process sets of fingerprints from a plurality of mobile devices. This may have the effect that processing resources of the mobile device are saved. This may further have the effect that a positioning quality for a site may be determined in common based on a set of fingerprints that have been collected by several mobile devices at the same site.

Figure 3:
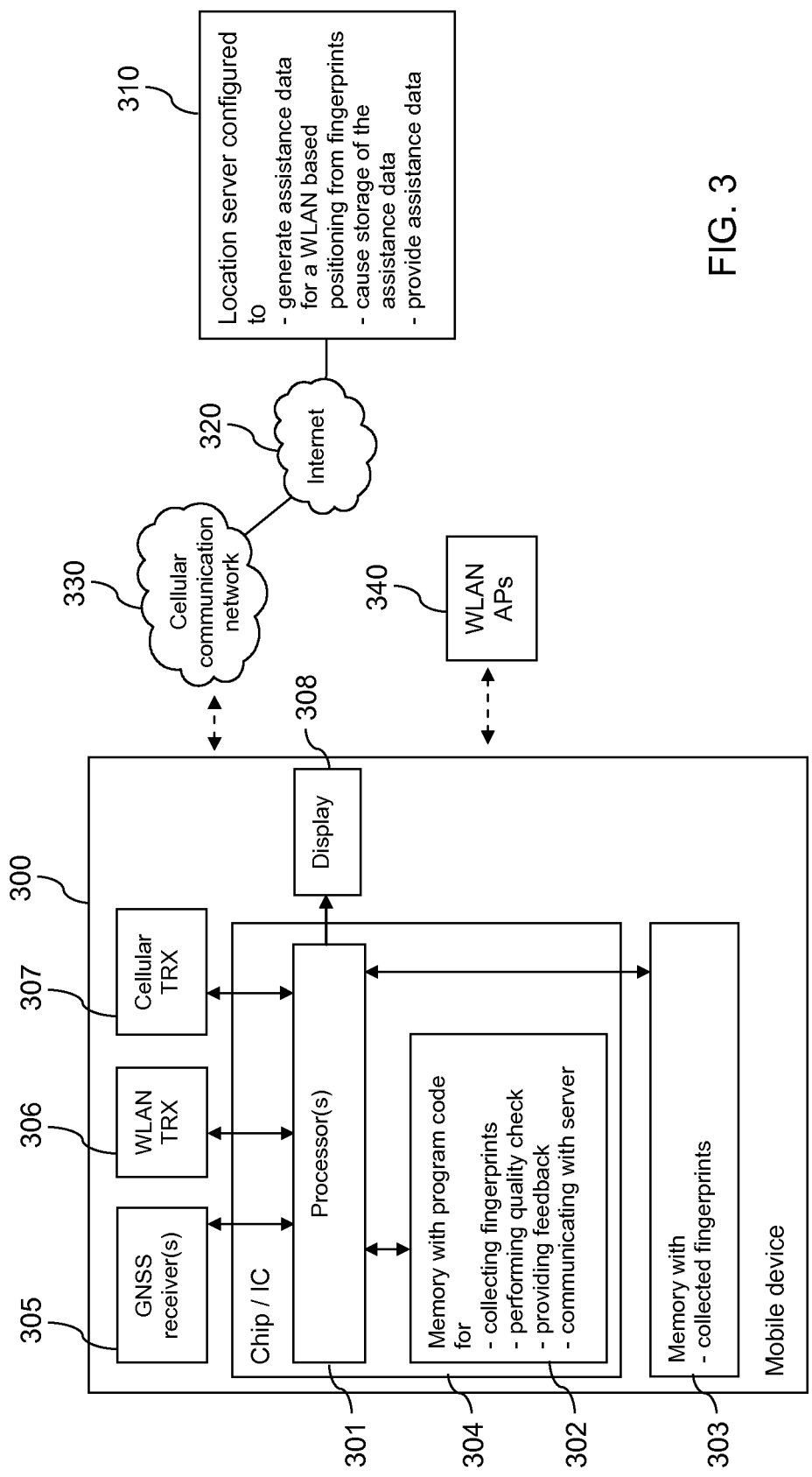
FIG. 3 is a schematic block diagram of a first example embodiment of a system.

FIG. 3 is a schematic block diagram of a first example embodiment of a system according to the invention. The system may support positioning quality assurance at a mobile device that is used for surveying.

The system comprises a mobile device 300 and a location server 310. The system further comprises a network 320, by way of example the Internet. The system further comprises a cellular communication network 330 that is connected to the Internet 320. The system further comprises a number of WLAN access points (AP) 340.

Mobile device 300 may be for instance a mobile terminal, like a regular smartphone or a dedicated surveying device. Mobile device 300 comprises a processor 301 that is linked to a first memory 302, to a second memory 303, to at least one GNSS receiver 305, to a WLAN component 306, to a cellular communication component 307 and to a display 308.

Processor 301 is configured to execute computer program code, including computer program code stored in memory 302, in order to cause mobile device 300 to perform desired actions.

Memory 302 stores computer program code for collecting fingerprints, computer program code for performing a quality check on collected fingerprints, computer program code for providing a feedback to a user of mobile device 300 and computer program code for communicating with server 310. Some of the program code in memory 302 may be similar to the program code in memory 102. In addition, memory 302 could store computer program code configured to realize other functions. In addition, memory 302 could also store other kind of data.

Processor 301 and memory 302 may optionally belong to a chip or an integrated circuit 304, which may comprise in addition various other components, for instance a further processor or memory.

Memory 303 is configured to store data, including for example data of collected fingerprints and data of computed radio models. It could be configured to store any other desired data as well.

The at least one GNSS receiver 305 could comprise any kind of global navigation satellite signal receiver for example a GPS receiver and/or a GLONASS receiver and/or a GALILEO receiver. It may be configured to receive corresponding satellite signals and to determine the current position of mobile device 300 based on the signals, possibly using assistance data.

WLAN component 306 includes at least a WLAN transceiver (TRX). WLAN component 306 enables mobile device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication could be stored in an own memory of WLAN component 306 and executed by an own processor of WLAN component 306, or it could be stored for example in memory 302 and executed for example by processor 301.

Cellular communication component 307 includes at least a cellular transceiver. It enables mobile device 300 to communicate with other entities via cellular communication network 330. It could be a cellular engine that is configured to take care of all processing required for a cellular communication.

Alternatively, at least some of the processing that is required for a cellular communication may be realized by processor 301 executing corresponding additional program code stored in memory 302.

Display 308 could be a touchscreen or a display that is not touch sensitive.

It is to be understood that mobile device 300 could comprise various other components, like user input means and speakers.

Component 304 or mobile device 300 could be an example embodiment of an apparatus according to the invention.

Location server 310 is a server that is configured to receive fingerprints from various mobile devices via the Internet 320, to generate assistance data for a WLAN based positioning based on the received fingerprints, to cause storage of the assistance data and to provide the assistance data to mobile terminals or other entities upon request. It could also be configured to carry out positioning computations upon request based on provided radio measurements. Server 310 could comprise a memory for storing the assistance data or it could be configured to access an external memory storing the assistance data, optionally via another server.

Cellular communication network 330 could be any kind of cellular communication network, like a Global System for Mobile Communications (GSM), a CDMA2000, a Universal Mobile Telecommunications System (UMTS), or a long term evolution (LTE) based communication network.

The WLAN access points (AP) 340 could be access points of one or more WLANs. The WLAN or WLANs may but do not have to be connected to the Internet 320.

Figure 4:
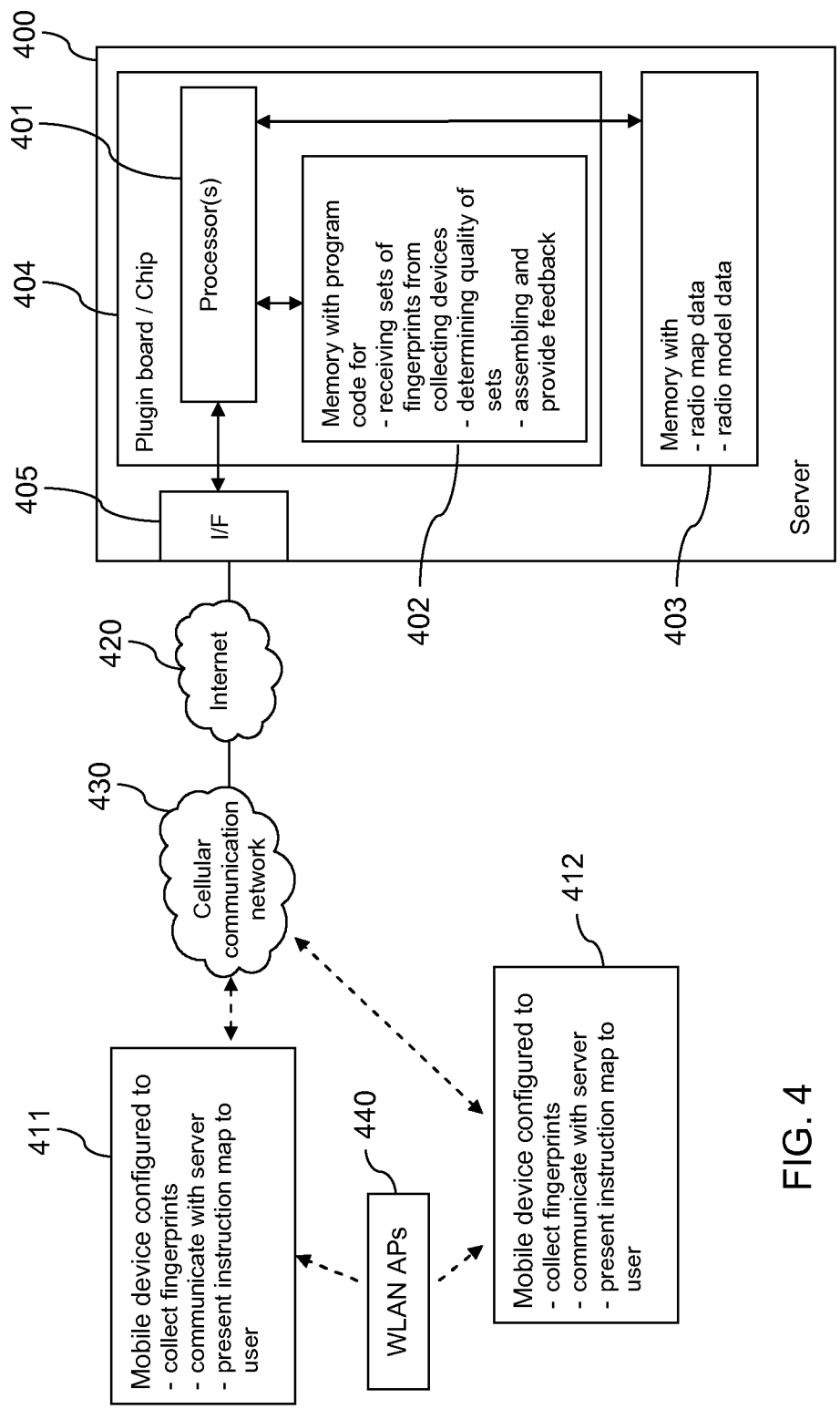
FIG. 4 is a schematic block diagram of a second example embodiment of a system.

FIG. 4 is a schematic block diagram of a second example embodiment of a system according to the invention. In this case, the system may support positioning quality assurance at a server.

The system comprises a server 400 and a plurality of mobile devices 411, 412. The system further comprises a network 420, by way of example the Internet. The system further comprises a cellular communication network 430 that is connected to the Internet 420. The system further comprises a number of WLAN access points (AP) 440.

Server 400 may be for instance a server that is provided specifically for checking the quality of collected sets of fingerprints, or it could be a server which collects fingerprints for generating and updating data for a large positioning database, or it could be any other server. Server 400 comprises a processor 401 that is linked to a first memory 402, to a second memory 403 and to an interface (I/F) 405.

Processor 401 is configured to execute computer program code, including computer program code stored in memory 402, in order to cause server 400 to perform desired actions.

Memory 402 stores computer program code for receiving sets of fingerprints from collecting devices, computer program code for performing a quality check on sets of fingerprints, and computer program code for assembling and providing a feedback for presentation to a user of the collecting devices. Some of the program code may be similar to the program code stored in memory 102. In addition, memory 402 could store computer program code configured to realize other functions, for instance program code for generating assistance data based on fingerprints, for providing assistance data to mobile devices upon request and/or for performing positioning computations for mobile devices upon request. In addition, memory 402 could also store other kind of data.

Processor 401 and memory 402 may optionally belong to a plug-in board or a chip with an integrated circuit 404, which may comprise in addition various other components, for instance a further processor or memory.

Memory 403 is configured to store data, including for example data of received sets of fingerprints. In addition, it could store other data, including for example assistance data for a WLAN based positioning, like data of generated radio maps and data of computed radio models.

It is to be understood that the data of memory 403 could also be distributed to several memories, which may be partly or completely external to server 400. For example, sets of fingerprints that are stored for checking a positioning quality that can be achieved with the sets could be stored internal to server 400 and computed assistance data could be stored at an external memory that is accessible via another server.

Interface 405 is a component which enables server 400 to communicate with other devices, like mobile device 411 and 412, via networks 420 and 430. It could also enable server 400 to communicate with other entities, like other servers. Interface 405 could comprise for instance a TCP/IP socket.

It is to be understood that server 400 could comprise various other components.

Component 404 or server 400 could be an example embodiment of an apparatus according to the invention.

Mobile devices 411, 412 may be for instance mobile terminals, like regular smartphones or dedicated surveying devices. They are configured to collect fingerprints, to communicate with server 400 and to present information to a user. Mobile devices 411, 412 may be similar to mobile device 300 of FIG. 3, except that they do not have to have program code for performing a quality check stored in memory 302.

Cellular communication network 430 could be again any kind of cellular communication network.

The WLAN access points (AP) 440 could be again access points of one or more WLANs. The WLAN or WLANs may but do not have to be connected to the Internet 420.

While the systems of FIG. 3 and FIG. 4 are different in that the system of FIG. 3 enables a mobile device 300 to perform a quality check and the system of FIG. 4 enables a server 400 to perform a quality check, the actual operations that are carried out for the quality check may be similar.

Example operations in the system of FIG. 3 will now be described with reference to FIGS. 5 to 7.

Processor 301 and some of the program code stored in memory 302 may cause mobile device 300 of FIG. 3 to perform the presented actions when the program code is retrieved from memory 302 and executed by processor 301.

A surveying person may be requested to collect fingerprints in a particular localization area, for instance on all floors of a particular building. The surveying person may activate an application comprising the program code for collecting fingerprints in memory 304 for automatically collecting fingerprints while he is moving through the area. As a result, GNSS receiver 305 and WLAN component 306 may be activated. GNSS receiver 305 captures satellite signals and estimates the position of mobile device 300 at regular intervals, for example once per second. Since the satellite signals may be difficult to receive in the building, the positioning could be assisted by assistance data that is provided by some GNSS assistance server via cellular communication network 330 and received at mobile device 300 via cellular communication component 307. WLAN component 306 detects radio signals from WLAN access points 340 in the environment and perform radio measurements at the same regular intervals. The results of the measurements may contain for example a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.). Fingerprints are assembled to comprise a location that has been determined at a particular time and results of measurements for one or more WLAN access points 340 that have been obtained basically at the same time. (action 501) Alternatively to using a satellite signal based positioning for obtaining information on the measurement locations, the surveying person could be required to enter information on a respective measurement location, for instance based on a map that guides him through the building.

The surveying person may move slowly through the localization area guided by a grid overlaying a map of the localization area with the target to pass through each of the grid areas of the grid, as far as lying inside of the localization area, at least once. In the case of a GNSS based positioning, an indication of the respective position of the surveying person could be indicated on the map as well as further guidance. Alternatively, the surveying person could try to uniformly pass through all parts of the area on his own. The collected fingerprints may be stored in memory 303.

Mobile device 300 obtains a complete set of fingerprints from memory 303. (action 511) A set of fingerprints may be obtained upon indication of the surveying person that a first survey of the localization area has been completed, or it could be obtained on a regular basis or even continuously during the ongoing survey. In the latter cases, a set of fingerprints may always include all fingerprints that have been collected so far.

Mobile device 300 uniformly selects fingerprints from the obtained set of fingerprints. A uniform selection may be obtained for example by selecting every nth fingerprint. The value of n could be set for example to 5 or to any other natural number greater than 1. The selected fingerprints are used as test fingerprints. (action 512)

Mobile device 300 now generates a radio model based on the obtained set of fingerprints excluding the selected test fingerprints and thus on a reduced set of fingerprints. (action 513) The radio model may be any kind of model that enables an estimation of a position based on available radio measurements on matching WLAN access points.

For generating a radio model, a grid could be defined for each floor of the surveyed localization area. Each grid could be a uniformly spaced rectangular two-dimensional grid representing a geographical area that includes the area of one of the floors of the localization area. The measurement results in each of the fingerprints of the reduced set of fingerprints could then be mapped to a grid point of the grids that is provided for one of the floors. Each grid point could represent a particular geographic location of the surveyed localization area and possibly of some surrounding area. The correct floor and thus the correct grid could be determined based on an altitude component in the location that is indicated in the respective fingerprint and on knowledge about the floor height in a building. The grid point to which the measurement results of a particular fingerprint are mapped could be the grid point that corresponds to a real location that is closest to the horizontal location indicated in the fingerprint. If the measurement results for the same WLAN access point from several fingerprints would be mapped to the same grid point, an average value of the RSS values could be used, for example. The result is a radio map, which may be considered one possible form of a radio model.

Alternatively or in addition, other radio models could be generated. For another radio model, for example, a position and a coverage area of each observed WLAN access point could be estimated. In a simple approach, the position could be estimated to correspond to the average location of all measurements for a particular WLAN access point, and a radius of a circular coverage area could be given by the distance of the most distant location a measurement in any of the fingerprints for the WLAN access point to the estimated position of the WLAN access point. For yet another radio model, for example, a position of a respective WLAN access point, a transmission power and an average pathloss could be computed based on the location and the RSS values included in the fingerprints for a respective WLAN access point. The computation could be based for example on a standard radio signal propagation model and the Gauss-Newton algorithm for a non-linear fitting problem. Both radio models may be determined on a per floor basis. A pathloss model could also be used for generating a radio map by assigning estimated radio signals strength for each WLAN access point to a grid point of a grid. This may have the effect that estimated received signal strength values can be obtained for locations at which no measurements have been taken so far.

Mobile device 300 may then estimate the location of the measurements in each of the test fingerprints based on the generated radio model. (action 514) The location may be determined in a conventional manner, depending on the kind of the available radio model. For instance, in the case of a radio map, the Euclidean distance between the measurements in the test fingerprint and the measurements associated with each grid point of grids for all floors could be determined; the smallest distance indicating the best match of a grid point of all grids and thus of the corresponding location. The indicated location includes a horizontal position and a floor number. In case the radio model indicates the coverage area of each WLAN access point, the location may be estimated by determining the intersecting area of all WLAN access point for which measurement results are included in a test fingerprint. The location could then be estimated to correspond to the center of this intersecting area. If the radio model is a pathloss model, circles around each WLAN access point indicated in the fingerprint could be defined with the radius being based on the RSS value for the respective WLAN access point. The location could then be estimated to correspond to an intersection of all determined circles. Additional measures may have to be taken for the case that there are suitable intersections for different floors.

Mobile device 300 may now determine a discrepancy between the estimated locations for all test fingerprints and the locations indicated in the test fingerprints. (action 515) The discrepancy may include for example a distance between the horizontal locations in meters and an altitude error in number of floors. The determined discrepancies may serve as positioning quality indicators for locations at which the test fingerprints have been collected.

Next, mobile device 300 may classify the positioning quality in various subareas. (action 516) Each subarea may correspond for example to a cell of a grid. The positioning quality in each subarea may be classified for example as "poor", "satisfactory", "good" or "unknown". A positioning quality in a particular subarea may be classified to be "poor", for example, if the floor of the measurements for the test fingerprints collected in this subarea is determined incorrectly in at least a predetermined percentage, for example 25%, of the cases or if the average horizontal error is larger than a predefined threshold in meters, for example 20 meters. A positioning quality in a particular subarea may be classified to be "satisfactory", for example, if the floor of the measurements for the test fingerprints collected in this subarea is determined correctly in more than a predetermined percentage, for example 75%, of the cases and the average horizontal error lies between two predefined thresholds in meters, for example between 10 and 20 meters. A positioning quality in a particular subarea may be classified to be "good", for example, if the floor of the measurements for the test fingerprints collected in this subarea is determined correctly in more than a predetermined percentage, for example 75%, of the cases and the average horizontal error is smaller than a predefined threshold in meters, for example 10 meters. A positioning quality in a particular subarea may be classified to be "unknown", for example, if no test fingerprints had been selected for this subarea.

It is to be understood that any other classification could be used just the same, as well with respect to the indicated error values as with respect to the indicated classes.

Mobile device 300 could generate information to the user based on this classification. To this end, mobile device 300 may generate a matrix per floor. Each cell of the matrix may correspond to one of the subareas. A value representing the classification that has been determined in action 516 for a respective subarea may be associated with the corresponding cell. The values may be for example of an enumeration type {'Poor', 'Satisfactory', 'Good', 'Unknown'}. (action 517)

The matrix may be converted into a presentation to a user of mobile device 300 via display 308. (action 521) The presentation may include a map with the outlines of a floor, possibly including an indication of inner walls, open spaces—as in the case of stair cases or elevators —, etc. The presentation may include in addition a grid, with each grid area corresponding to one of the subareas. Each grid area may be marked depending on the classification value associated to the corresponding subarea in the matrix.

Figure 6:
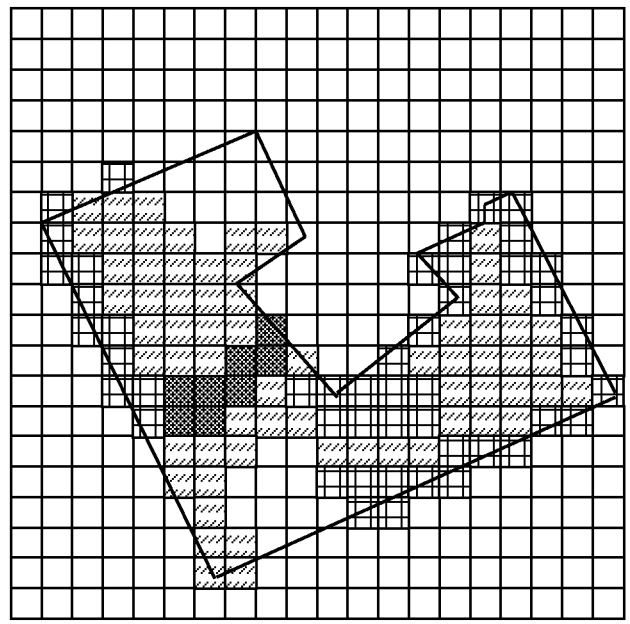
FIG. 6 is a diagram illustrating a first example of a presentation to a user of a mobile device in the system of FIG. 3 or 4.

FIG. 6 is a diagram illustrating such a presentation for a floor of a building. For reasons of simplicity, only the outlines of the floor are indicated. Additional details could be added. In a grid covering the map, each grid area has been provided with one of four patterns, indicating whether the positioning quality in the corresponding subarea has been classified to be good, satisfactory, poor or unknown. It is to be understood that any other kind of marking could be used. In a practical implementation, it would be possible, for example, to indicate "poor" subareas with red color, "satisfactory" subareas with yellow color, "good" subareas with green color and "unknown" subareas with grey color. As a result, maintaining situation awareness for the user is as easy as possible. A user may be caused by the presentation to visit the "poor" subareas within the boundaries of the localization area again for collection of fingerprints and to visit the "unknown" subareas at least for the collection of test fingerprints, as far as possible. Some areas may lie outside of the building or not be accessible, for example, so these may be omitted.

For an alternative or additional approach to action 517 and 521, mobile device 300 may split the localization area into sections requiring additional collection of fingerprints and sections not requiring additional collection of fingerprints. (action 518) Sections requiring additional collection of fingerprints may be the combination of all subareas with unknown positioning quality and of all subareas with poor positioning quality, for which few fingerprints have been collected so far. The latter may be determined by computing the density of fingerprints per subarea that have been obtained with the set of fingerprints in action 511. Subareas having a density below a predetermined threshold are subareas for which few fingerprints have been collected so far and subareas having a density above the predetermined threshold are subareas for which a fairly large number of fingerprints has already been collected. Sections not requiring additional collection of fingerprints may be the combination of all subareas with good positioning quality, of all subareas with satisfactory positioning quality and of all subareas with poor positioning quality, for which a fairly large number of fingerprints has already been collected. It may not be useful to cover subareas with "poor" positioning quality and a fairly large number of fingerprints again, since additional fingerprints in such subareas may not improve accuracy of the system. This action may be seen as an alternative classification of the positioning quality in different subareas.

The information obtained in action 518 may also be used for guiding the user to collect additional fingerprints in sections in which this is required.

To this end, mobile device 300 may equally generate a matrix per floor. Each cell of the matrix may correspond to one of the subareas. A value representing the classification that has been determined in action 518 for a respective subarea may be associated with the corresponding cell. The values may be for example of an enumeration type {'Yes', No'}. (action 519)

The matrix may be converted into a presentation to a user of mobile device 300 via display 308. (action 522) The presentation may include again a map with the outlines of a floor, possibly including an indication of inner walls, open spaces, etc. The presentation may include in addition a grid, with each grid area corresponding to one of the subareas. Each grid area may be marked depending on the classification value associated to the corresponding subarea in the matrix.

Figure 7:
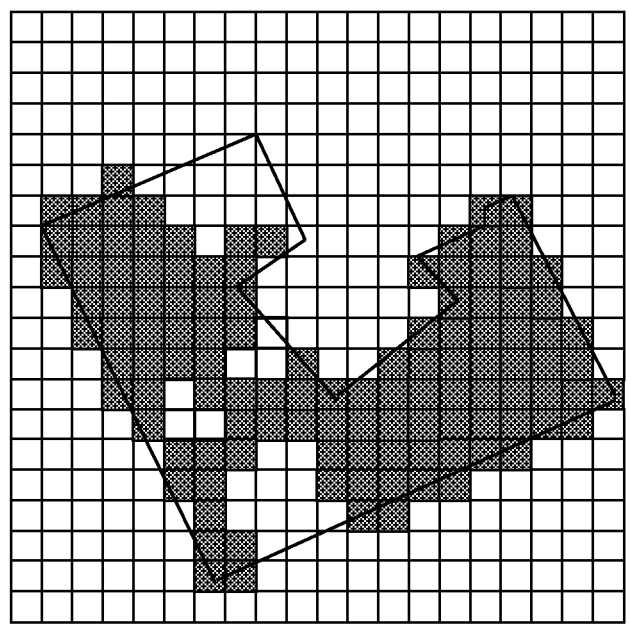
FIG. 7 is a diagram illustrating a second example of a presentation to a user of a mobile device in the system of FIG. 3 or 4.

FIG. 7 is a diagram illustrating such a presentation for a floor. For reasons of simplicity, only the outlines of the floor are indicated. Additional details could be added. In a grid covering the map, each grid area has been provided with one of two patterns, indicating whether additional fingerprints should be collected in a subarea corresponding to this grid area or not. It is to be understood that any other kind of marking could be used. A user may thus easily see which subareas have to be visited again for the collection of fingerprints. When comparing FIG. 7 to FIG. 6, it can be seen that a few subareas that have been marked to have a poor positioning quality in FIG. 6 are not included in those subareas in FIG. 8 that have to be visited again, since there may already be a fairly large number of fingerprints for these subareas.

It is to be understood that further criteria may be considered by mobile device 300 or the user of mobile device 300 for determining whether certain subareas have to be visited again for a collection of data. For instance, if the collector comes to the conclusion that positioning quality is poor due to reasons other than fingerprints density and coverage, for example due to a poor WLAN infrastructure, meaning that no data collection effort therein can improve the performance, a further visiting of such subareas may be omitted.

Once the additional collection has been completed, a completed set of fingerprints may be transmitted by mobile device 300 to server 310 via cellular communication network 330 and the Internet 320. Server 310 may then generate assistance data for a WLAN based positioning from the obtained set of fingerprints. The assistance data may be in the form of a radio map or some other kind of radio model. Server 310 causes storage of the assistance data and provides the assistance data to mobile devices upon request. These mobile devices may then determine their position using the assistance data and radio measurements on WLAN access points at their current position.

Figure 5:
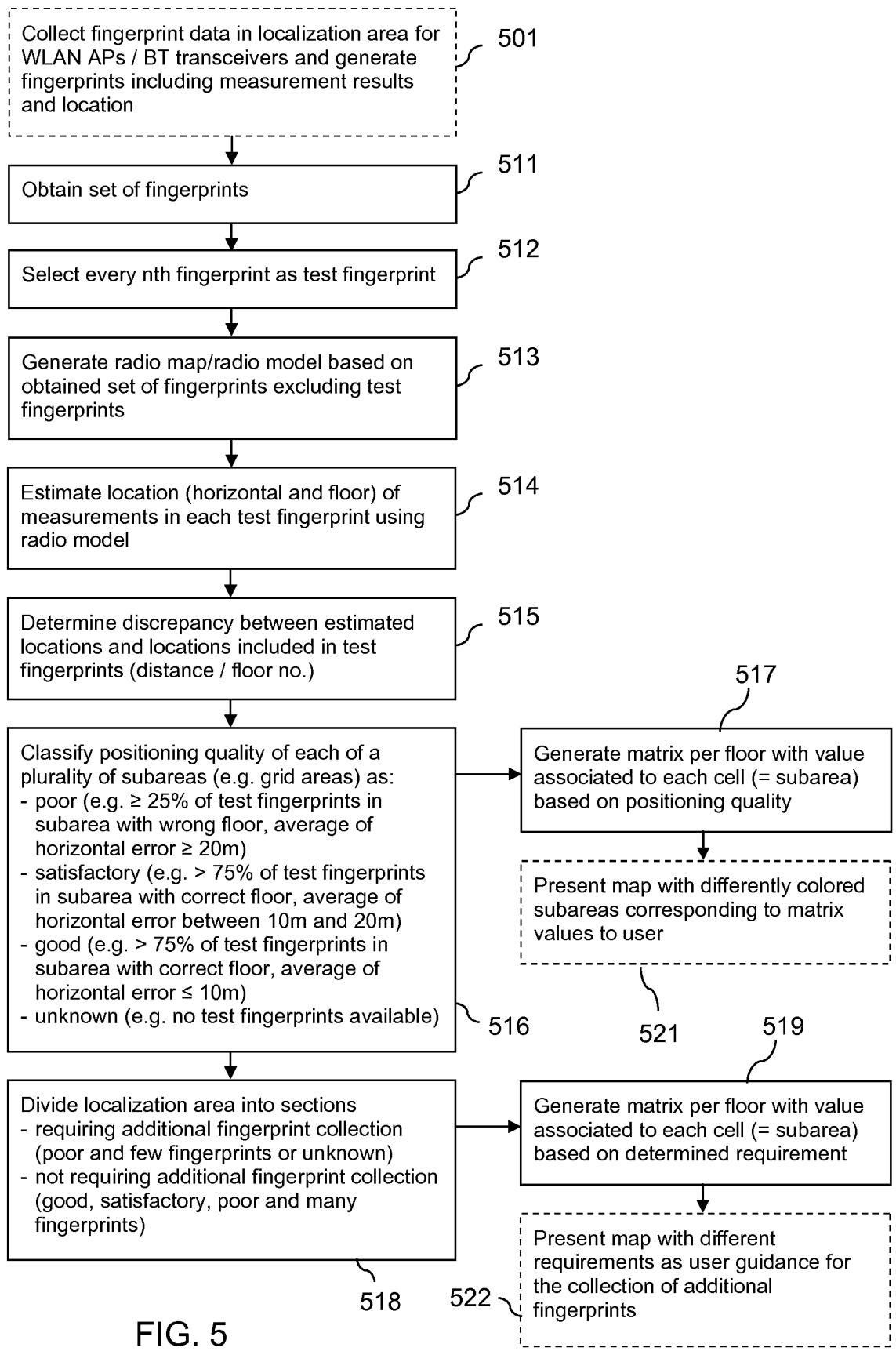
FIG. 5 is a flow chart illustrating an example embodiment of an operation in the system of FIG. 3 or 4.

In example operations in the system of FIG. 4, in contrast, processor 401 and some of the program code stored in memory 402 may cause server 400 to perform the actions 511 to 519 of FIG. 5 when the program code is retrieved from memory 402 and executed by processor 401. Actions 501, 521 and 522 could be performed by mobile devices 411, 412 of FIG. 4, and any communication between mobile devices 411, 412 and serer 400 may take place via cellular communication network 430 and the Internet 420.

Server 400 may obtain sets of fingerprints from various mobile devices 411, 412.

Server 400 may treat the set of fingerprints from each mobile device 411, 412 separately. In this case, the result of a classification, for instance matrices generated in action 517 or action 519, will be transmitted to a single user for presentation on a display of his mobile device 411, 412.

Alternatively, server 400 could treat fingerprints from several mobile devices 411, 412 as one set of fingerprints that is processed in common. This may be useful, for instance, if several users of mobile devices survey a single localization area in a joint effort. For example, several users may split the survey of a building among each other by floors and/or by wings or other parts of a building. In this case, the result of a classification for the localization area, for instance matrices generated in action 517 or 519, will be transmitted to each of the users for presentation on a display of his mobile device 411, 412.

It is to be understood that the presented example systems as well as the presented example operations may be varied in many ways. The operations may be varied for instance by modifying actions, by omitting actions and/or by adding actions. In addition, the order of actions could be modified.

For example, if the operation presented in FIG. 5 is carried out at mobile device 300, the generation of a matrix in action 517 or action 519 could be omitted and a presentation to a user could be generated directly based on the classification in action 516 and 518, respectively.

For example, instead of using a two-dimensional grid per floor in action 513, it would also be possible to use a cuboid three-dimensional grid for an entire multi-level building.

For example, in an alternative embodiment, the fingerprints could include results on measurements on signals of other non-cellular terrestrial communication nodes instead of or in addition to WLAN access point signals.

Alternatively or as a supplement to using test fingerprints that are extracted from a set of collected fingerprints, as in the operations presented with reference to FIG. 5, a user may also collect test fingerprints separately from fingerprints that are used for radio model generation. In this case, the test fingerprints could be collected for example specifically for testing purposes. For instance at first, at least one set of fingerprints collected at a particular localization site may be obtained, e.g., as in action 511 of FIG. 5. The obtained fingerprints may be used for generating at least one radio model, e.g., similarly as in action 513, just using all of the fingerprints that have been obtained so far for the localization site. A user may then collect additional test fingerprints along some track at the localization site. These test fingerprints may be used in the same or in a similar manner as the test fingerprints in actions 514 to 522 for determining and indicating at which places additional fingerprints may have to be collected.

Summarized, certain embodiments of the invention may have the effect that data collectors do not need to waste resources, namely their time, on the collection of fingerprints that do not contribute to the performance of the systems. This allows optimizing resources for data collection. Certain embodiments of the invention may have the effect that a person collecting data is guided to areas where additional data collection is needed, and that it is indicated when collected data is sufficient for radio model generation. This may make the process of data collection more efficient and comfortable.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 8:
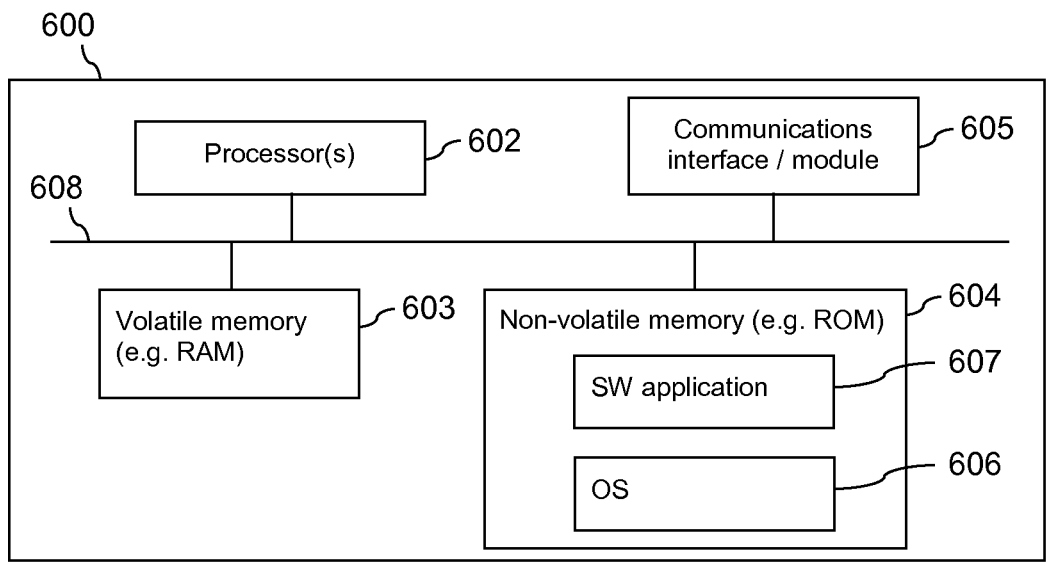
FIG. 8 is a schematic block diagram of an example embodiment of an apparatus.
Figure 9:
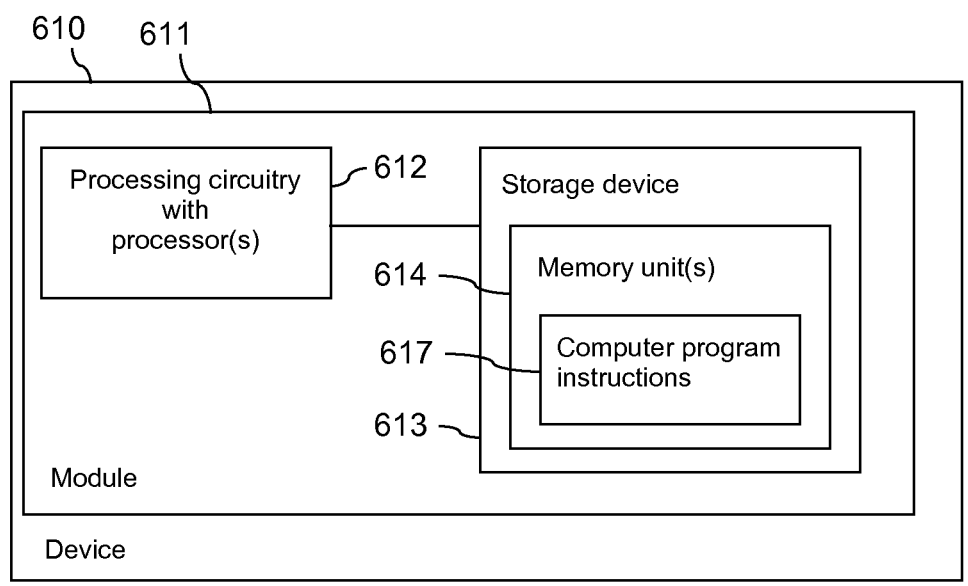
FIG. 9 is a schematic block diagram of an example embodiment of an apparatus.

Example embodiments using at least one processor and at least one memory as a non-transitory data medium are shown in FIGS. 8 and 9.

FIG. 8 is a schematic block diagram of a device 600. Device 600 includes a processor 602. Processor 602 is connected to a volatile memory 603, such as a RAM, by a bus 608. Bus 608 also connects processor 602 and RAM 603 to a non-volatile memory 604, such as a ROM. A communications interface or module 605 is coupled to bus 608, and thus also to processor 602 and memories 603, 604. Within ROM 604 is stored a software (SW) application 607. Software application 607 may be a positioning application, although it may take some other form as well. An operating system (OS) 606 also is stored in ROM 604.

FIG. 9 is a schematic block diagram of a device 610. Device 610 may take any suitable form. Generally speaking, device 610 may comprise processing circuitry 612, including one or more processors, and a storage device 613 comprising a single memory unit or a plurality of memory units 614. Storage device 613 may store computer program instructions 617 that, when loaded into processing circuitry 612, control the operation of device 610. Generally speaking, also a module 611 of device 610 may comprise processing circuitry 612, including one or more processors, and storage device 613 comprising a single memory unit or a plurality of memory units 614. Storage device 613 may store computer program instructions 617 that, when loaded into processing circuitry 612, control the operation of module 611.

The software application 607 of FIG. 8 and the computer program instructions 617 of FIG. 9, respectively, may correspond e.g. to the computer program code in any of memories 102, 302 or 402, respectively.

Figure 10:
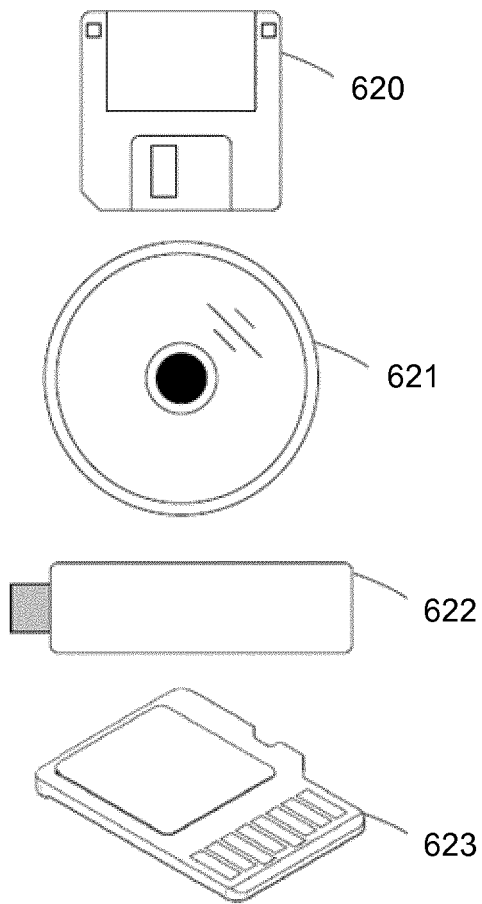
FIG. 10 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 10, which presents, from top to bottom, schematic diagrams of a magnetic disc storage 620, of an optical disc storage 621, of a semiconductor memory circuit device storage 622 and of a Micro-SD semiconductor memory card storage 623.

The functions illustrated by processor 101 in combination with memory 102, or processor 301 in combination with memory 302, or component 304, or processor 401 in combination with memory 402, or component 404 can also be viewed as means for obtaining fingerprints that have been collected by at least one mobile device for supporting a positioning of other mobile devices, each fingerprint comprising results of measurements on radio signals of at least one communication node at a particular location and an indication of the particular location; means for determining a positioning quality that can be achieved in a positioning which is based on obtained fingerprints collected by the at least one mobile device; and means for generating, based on the determined positioning quality, a feedback to a user of the at least one mobile device, the feedback indicating whether further fingerprints should be collected.

The program codes in memories 102, 302 and 402 can also be viewed as comprising such means in the form of functional modules.

FIGS. 2 and 5 may also be understood to represent example functional blocks of computer program codes supporting positioning quality assurance.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:

1. A method comprising, performed by at least one apparatus:
   obtaining fingerprints that have been collected by at least one mobile device, each of the fingerprints respectively including results of measurements on radio signals of at least one communication node at a particular location and an indication of the particular location;
   selecting one or more of the obtained fingerprints as test fingerprints;
   generating, based on one or more of the obtained fingerprints excluding the test fingerprints, a radio model supporting a positioning of mobile devices that are configured to perform measurements on radio signals;
   estimating a location of the measurements respectively for each of the test fingerprints based on the generated radio model;
   determining, respectively for each of the one or more test fingerprints that were selected, a location error indicating a difference between (i) the estimated location determined for the respective test fingerprint based on the generated radio model, and (ii) the particular location indicated by the respective test fingerprint; and
   generating, based on the one or more determined location errors, a feedback to one or more mobile devices, wherein the feedback indicates one or more of where or whether further fingerprints should be collected.

2. The method according to claim 1, wherein selecting one or more of the obtained fingerprints as test fingerprints comprises selecting every nth of the obtained fingerprints, with n being a natural number greater than 1.

3. The method according to claim 1, wherein determining the location error comprises one or more of:
   determining a distance between a horizontal component of the estimated location and a horizontal component of the particular location;
   determining a difference in height between an altitude component of the estimated location and an altitude component of the particular location; or
   determining a difference in floor numbers of a floor associated with an altitude component of the estimated location and a floor corresponding to an altitude component of the particular location.

4. The method according to claim 3, wherein determining the difference in floor numbers further comprises generating a matrix for each floor for which fingerprints are to be collected in an area, each cell of the matrix corresponding to a subarea, each cell of the matrix including a positioning quality indicator for the associated subarea, and the positioning quality indicator being based on the determined positioning quality for the subarea.

5. An apparatus comprising at least one processor and at least one memory including computer program code, the at least one memory and the computer program code configured to, with the at least one processor, cause the apparatus at least to perform:
   obtain fingerprints that have been collected by at least one mobile device, each of the fingerprints respectively including results of measurements on radio signals of at least one communication node at a particular location and an indication of the particular location;
   select one or more of the obtained fingerprints as test fingerprints;
   generate based on one or more of the obtained fingerprints excluding the test fingerprints, a radio model supporting a positioning of mobile devices that are configured to perform measurements on radio signals;
   estimate a location of the measurements respectively for each of the test fingerprints based on the generated radio model;
   determine respectively for each of the one or more test fingerprints that were selected, a location error indicating a difference between (i) the estimated location determined for the respective test fingerprint based on the generated radio model, and (ii) the particular location indicated by the respective test fingerprint; and
   generate, based on the one or more determined location errors, a feedback to one or more mobile devices, wherein the feedback indicates one or more of where or whether further fingerprints should be collected.

6. The method according to claim 1, wherein the feedback comprises positioning quality for each of a plurality of subareas for which fingerprints are collected, wherein the positioning quality for each of a subarea is determined based on one of:
   a result of the determined location error for each of the one or more test fingerprints; and
   a result of a density of the obtained fingerprints which comprise an indication of a location lying in the subarea.

7. The method according to claim 6, wherein the determined positioning quality for a respective subarea is classified to be one of:
   poor or good;
   poor or satisfactory or good;
   poor or satisfactory or good or unknown; or
   requires additional measurements or does not require additional measurements.

8. The method according to claim 7, wherein the positioning quality is determined on a regular basis during a collection of fingerprints by the at least one mobile device at a particular site comprising at least one subarea, and wherein the method further comprises:
   in an instance the position quality is determined to be poor, causing a feedback to the one or more mobile devices that the subarea requires additional measurements;
   in an instance the position quality is determined to be satisfactory or good, causing the feedback to one or more mobile devices that the subarea does not require additional measurements; and
   in an instance the position quality is determined to be unknown and no communication node is available, causing the feedback to one or more mobile devices that the subarea does not require additional measurements.

9. The method according to claim 6, wherein generating the feedback to the one or more mobile devices comprises presenting, on a display, a map of an area in which fingerprints are to be collected, the map including a marking for each of a plurality of subareas, and wherein the marking depending on a positioning quality determined for the respective subarea.

10. The method according to claim 1, wherein the at least one communication node comprises at least one of:
   at least one terrestrial non-cellular transmitter; and/or
   at least one access point of at least one wireless local area network; and/or
   at least one Bluetooth transmitter; and/or
   at least one Bluetooth low energy transmitter, and/or
wherein the at least one apparatus is or belongs to one of:
   the at least one mobile device; or
   a server that is configured to receive and process sets of fingerprints from a plurality of mobile devices.

11. The apparatus according to claim 5, wherein selecting one or more of the obtained fingerprints as test fingerprints comprises selecting every nth of the obtained fingerprints, with n being a natural number greater than 1.

12. The apparatus according to claim 5, wherein determining the location error comprises one or more of:
   determining a distance between a horizontal component of the estimated location and a horizontal component of the particular location;
   determining a difference in height between an altitude component of the estimated location and an altitude component of the particular location; or
   determining a difference in floor numbers of a floor associated with an altitude component of the estimated location and a floor corresponding to an altitude component of the particular location.

13. The apparatus according to claim 12, wherein determining the difference in floor numbers further comprises generating a matrix for each floor for which fingerprints are to be collected in an area, each cell of the matrix corresponding to a subarea, each cell of the matrix including a positioning quality indicator for the associated subarea, and the positioning quality indicator being based on the determined positioning quality for the subarea.

14. The apparatus according to claim 5, wherein the feedback comprises positioning quality for each of a plurality of subareas for which fingerprints are collected, wherein the positioning quality for each of a subarea is determined based on one of:
   a result of the determined location error for each of the one or more test fingerprints; and
   a result of a density of the obtained fingerprints which comprise an indication of a location lying in the subarea.

15. The apparatus according to claim 14, wherein the at least one memory and the computer program code are configured to, with the at least one processor, cause the apparatus to, classify the determined positioning quality for a respective subarea to be one of:
   poor or good;
   poor or satisfactory or good;
   poor or satisfactory or good or unknown; or
   requires additional measurements or does not require additional measurements.

16. The apparatus according to claim 15, wherein the positioning quality is determined on a regular basis during a collection of fingerprints by the at least one mobile device at a particular site comprising at least one subarea, and wherein the at least one memory and the computer program code are configured to, with the at least one processor, cause the apparatus to:
   in an instance the position quality is determined to be poor, cause a feedback to the one or more mobile devices that the subarea requires additional measurements;
   in an instance the position quality is determined to be satisfactory or good, cause the feedback to one or more mobile devices that the subarea does not require additional measurements; and
   in an instance the position quality is determined to be unknown and no communication node is available, cause the feedback to one or more mobile devices that the subarea does not require additional measurements.

17. The apparatus according to claim 14, wherein generating the feedback to the one or more mobile devices comprises presenting, on a display, a map of an area in which fingerprints are to be collected, the map including a marking for each of a plurality of subareas, and wherein the marking depending on a positioning quality determined for the respective subarea.

18. The apparatus according to claim 5, wherein the at least one communication node comprises at least one of:
   at least one terrestrial non-cellular transmitter; and/or
   at least one access point of at least one wireless local area network; and/or
   at least one Bluetooth transmitter; and/or
   at least one Bluetooth low energy transmitter.

19. The apparatus according to claim 5, wherein the apparatus is one of:
   a chip;
   a module for a server;
   a server;
   a module for a mobile device; or
   a mobile device.

20. A computer readable storage medium in which computer program code is stored, the computer program code causing an apparatus to perform the following when executed by a processor:
   obtain fingerprints that have been collected by at least one mobile device, each of the fingerprints respectively including results of measurements on radio signals of at least one communication node at a particular location and an indication of the particular location;
   select one or more of the obtained fingerprints as test fingerprints;
   generate based on one or more of the obtained fingerprints excluding the test fingerprints, a radio model supporting a positioning of mobile devices that are configured to perform measurements on radio signals;
   estimate a location of the measurements respectively, for each of the test fingerprints based on the generated radio model;
   determine respectively for each of the one or more test fingerprints that were selected, a location error indicating a difference between (i) the estimated location determined for the respective test fingerprint based on the generated radio model, and (ii) the particular location indicated by the respective test fingerprint; and
   generate, based on the one or more determined location errors, a feedback to one or more mobile devices, wherein the feedback indicates one or more of where or whether further fingerprints should be collected.

* * * * *